United States Patent [19]

Wiktor

[11] 4,157,461

[45] Jun. 5, 1979

[54] AUTOMATIC TRANSFER SWITCH AND BYPASS SWITCH ARRANGEMENT

[75] Inventor: Dominick M. Wiktor, Cranford, N.J.

[73] Assignee: Automatic Switch Company, Florham Park, N.J.

[21] Appl. No.: 843,387

[22] Filed: Oct. 19, 1977

[51] Int. Cl.[2] ........................ H01H 3/00; H01H 9/00; H02J 7/00

[52] U.S. Cl. .................................. 200/18; 200/50 C; 307/64

[58] Field of Search ............. 200/48 R, 48 KB, 50 A, 200/50 AA, 50 C, 51 R, 18; 307/64, 85, 112, 113; 361/322–334, 335, 343, 346, 350, 351

[56] References Cited

U.S. PATENT DOCUMENTS

| | | | |
|---|---|---|---|
| 3,132,255 | 5/1964 | Spinelli et al. | 307/64 |
| 3,283,089 | 11/1966 | Anderson et al. | 200/18 |
| 3,697,709 | 10/1972 | Witkov | 200/48 R |
| 3,778,633 | 12/1973 | DeVissor et al. | 200/50 C X |
| 3,936,782 | 2/1976 | Moakler et al. | 307/64 X |
| 4,051,335 | 9/1977 | Ericson et al. | 200/50 AA |

*Primary Examiner*—James R. Scott

*Attorney, Agent, or Firm*—Alan H. Levine

[57] ABSTRACT

An arrangement including an automatic transfer switch, a bypass switch, and mutually cooperable pairs of contacts for electrically connecting the two switches. The entire transfer switch is movable as a unit toward and away from the bypass switch to engage and disengage, respectively, the cooperable pairs of contacts, disengagement of the contacts serving to isolate the transfer switch from the bypass switch and from the power sources and load. The transfer switch cannot be isolated from the bypass switch when the latter is open. The bypass switch can only be closed in a direction which connects the load to the same source of power to which the load is connected through the transfer switch. Each mutually cooperable pair of contacts engage each other solely by friction. There are at least three cooperable pairs of contacts, for connecting the transfer switch to a normal source of power, to an emergency source of power, and to a load, respectively. The two pairs of contacts for connecting the transfer switch to the sources engage before the pair of contacts for connecting the transfer switch to the load when the transfer switch is moved from a position in which all the cooperable pairs of contacts are disengaged toward a position of engagement.

15 Claims, 8 Drawing Figures

AUTOMATIC TRANSFER SWITCH AND BYPASS SWITCH ARRANGEMENT

BACKGROUND OF THE INVENTION

This invention relates to automatic transfer switches which are used to automatically transfer an electrical load from a normal source of electric power to an emergency source of electric power upon the happening of some predetermined event.

It is occasionally necessary to perform maintenance and repair work on an automatic transfer switch, or even to replace it. Therefore, a bypass switch is usually employed to provide continuity of power to the load while the transfer switch is out of service. Furthermore, it is important for safety reasons to completely disconnect or isolate the transfer switch from the power sources and load while work is being performed on the transfer switch. For this purpose, it is common to provide a separate isolation switch.

While systems of the type described above operate satisfactorily, they involve three separate switch devices (automatic transfer switch, bypass switch, and isolation switch), a considerable number of cable connections as well as long cable runs, and complicated safety interlocking schemes to prevent mishaps such as inadvertant disconnection of the load from a power source or connection of the load to both power sources at the same time. The complication and expense can be reduced by using a combination bypass and isolation switch as shown and described in U.S. Pat. No. 3,697,709.

SUMMARY OF THE INVENTION

It is an object of the present invention to reduce the complication and expense of an automatic transfer switch arrangement still further by effectively eliminating the isolation switch without, however, eliminating its function.

This objective is achieved by providing an automatic transfer switch which can be "plugged-in" to a stationary bypass switch installation, and readily "unplugged" to isolate the transfer switch for repair or replacement.

It is another object of the invention to provide means for preventing isolation of the transfer switch unless the load is connected to one of the power sources through the bypass switch, thereby preventing inadvertant interruption of power to the load.

If is a further object of the invention to provide means for preventing switching of the bypass switch to a condition in which it connects the load to a source of power other than the source to which the load is connected through the transfer switch.

It is an additional object of the invention to provide at least three pairs of mutually cooperable contacts through which the transfer switch is connected to the normal source, the emergency source, and the load, respectively, and wherein when the transfer switch is being moved from its isolation position to its operative position, the two pairs of contacts for connecting the transfer switch to the two sources engage before the third pair of contacts which connect the transfer switch to the load. As a result, a test position is provided wherein the load is disconnected from the transfer switch, but in which both sources are connected to the transfer switch to provide control voltages for testing the transfer switch control circuitry.

Additional features and advantages of the invention will be apparent from the following description in which reference is made to the accompanying drawings.

DESCRIPTION OF THE PREFERRED EMBODIMENT

The invention will be described in connection with a three phase system in connection with which a three-pole automatic transfer switch and a three-pole bypass switch are employed. However, it is understood that the invention has utility with other types of systems as well. The three poles of each switch are used to control power to the three phase conductors of the load. For the sake of simplicity, the neutral conductor connections are not shown.

Figure 1:
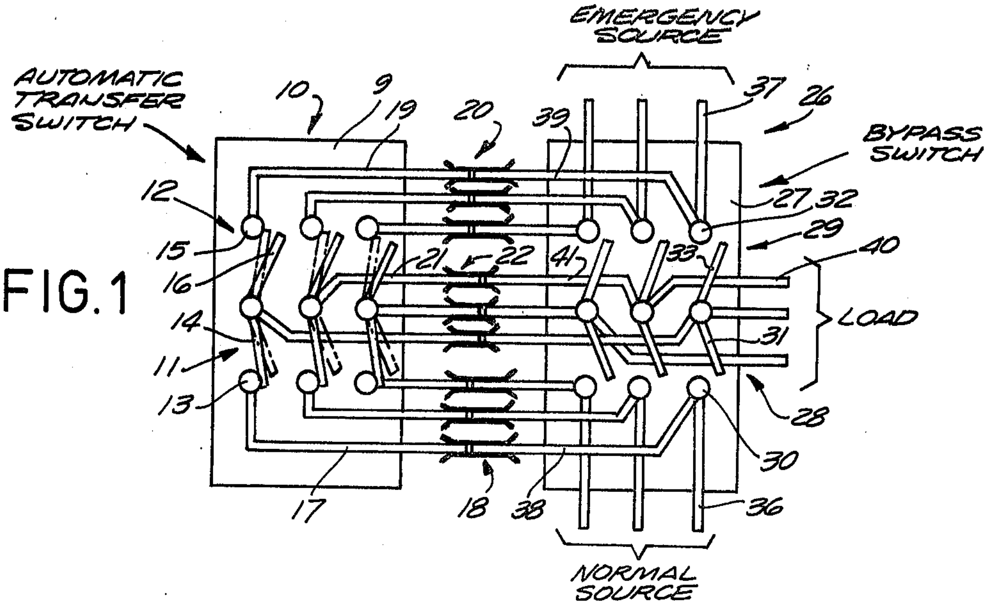
FIG. 1 is a schematic diagram of an automatic transfer switch and bypass switch arrangement according to the present invention.

In the schematic illustration of FIG. 1, the automatic transfer switch 10 is, for the most part, conventional and includes a base 9 carrying a set of three phase switches 11 for connecting a normal source of electric power, such as that provided by an electric utility, to a load, and a set of three phase switches 12 for alternatively connecting an emergency source of electric power, such as may be provided by a local engine-generator arrangement, to the load. Each of the switches 11 includes a stationary contact 13 and a movable contact 14, and each of the switches 12 includes a stationary contact 15 and a movable contact 16. Each stationary contact 13 is electrically connected to a preferably rigid conductor 17 which terminates in one contact of a pair of mutually cooperable contacts 18. Each stationary contact 15 is electrically connected to a preferably rigid conductor 19 which terminates in one contact of a pair of mutually cooperable contacts 20. The movable contact 14 of each of switches 11 is electrically connected to the movable contact 16 of one of the switches 12, and each interconnected pair of movable contacts 14 and 16 is electrically connected to a preferably rigid conductor 21 which terminates in one contact of a pair of mutually cooperable contacts 22.

The bypass switch 26 is also for the most part conventional, and includes a base 27 carrying a set of three phase switches 28 for connecting the normal source of power to the load, and a set of three phase switches 29 for connecting the emergency source of power to the load. Each of the switches 28 includes a stationary contact 30 and a movable contact 31, and each of the switches 29 includes a stationary contact 32 and a movable contact 33. Each stationary contact 30 is electrically connected to a phase conductor 36 of the normal source, and each stationary contact 32 is electrically connected to a phase conductor 37 of the emergency source. Each stationary contact 30 is also electrically connected to a preferably rigid conductor 38 which terminates in one contact of the pair of mutually cooperable contacts 18, and each stationary contact 32 is also electrically connected to a preferably rigid conductor 39 which terminates in one contact of the pair of mutually cooperable contacts 20.

The movable contact 31 of each of switches 28 is electrically connected to the movable contact 33 of one of the switches 29. Each interconnected pair of movable contacts 31 and 33 is electrically connected to a phase conductor 40 of the load, and is also electrically connected to a preferably rigid conductor 41 which terminates in one contact of the pair of mutually cooperable contacts 22.

Automatic transfer switch 10 has two alternative conditions, namely, switches 11 closed/switches 12 open and switches 11 open/switches 12 closed. Bypass switch 26 has three alternative conditions, namely, switches 28 closed/switches 29 open; switches 28 open/switches 29 closed; and a neutral condition in which switches 28 and 29 are all open.

In FIG. 1, bypass switch 26 is in its neutral condition, with switches 28 and 29 open, and the switches 11 of transfer switch 10 are closed, as shown in solid lines. As a result, load conductors 40 are electrically connected to normal source conductors 36 through conductors 41, pairs of contacts 22, conductors 21, switches 11, conductors 17, pairs of contacts 18, and conductors 38. At the same time, the load is disconnected from the emergency source.

If for some reason the load is to be disconnected from the normal source and connected to the emergency source, such as because the normal source has failed or because a ground fault has been detected in the normal source, transfer switch 10 automatically changes its condition so that switches 12 close and switches 11 open, as shown in broken lines in FIG. 1. The load conductors 40 are now connected to emergency source conductors 37 through conductors 41, pairs of contacts 22, conductors 21, switches 12, conductors 19, pairs of contacts 20, and conductors 39. This operation of the transfer switch is completely conventional.

Figure 2:
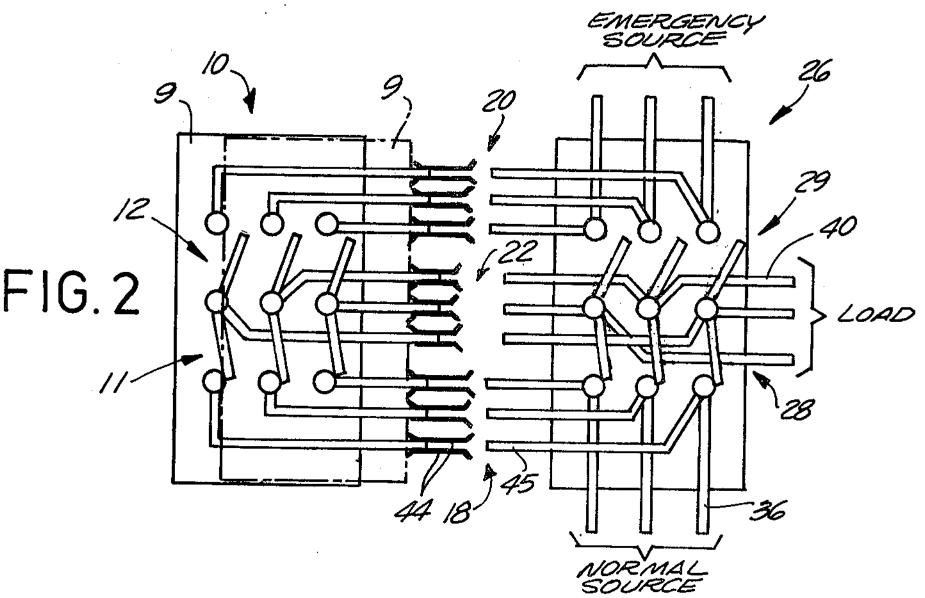
FIG. 2 is a schematic diagram showing the transfer switch in an isolated position.

Assume now that the load is connected to the normal source through transfer switch 10 (FIG. 1) and it is decided to do maintenance work on the transfer switch. First, bypass switch 26 is switched to the condition shown in FIG. 2 wherein switches 28 are closed and serve to connect load conductors 40 to normal source conductors 36. Next, according to this invention, base 9 and the entire transfer switch 10 carried by the base is moved away from bypass switch 26, i.e., from its original position shown in broken lines in FIG. 2 to a new position shown in solid lines. During the movement of the transfer switch, the mutually cooperable pairs of contacts 18, 20, and 22 separate, as shown in FIG. 2, and as a result transfer switch 10 is completely isolated from both power sources and the load. Repair and maintenance work may now be done on the transfer switch, or it may be replaced, with complete safety. When it is desired to bring the serviced or new transfer switch back into operation, the transfer switch is moved in the opposite direction, i.e., from its solid line position in FIG. 2 to its broken line position. In the latter position, all the pairs of contacts 18, 20, and 22 are engaged. Thereafter, bypass switch 26 is switched back to its neutral position shown in FIG. 1.

If at the time the transfer switch is to be isolated it is connecting the load to the emergency source, i.e., switches 12 are closed, switches 29 of bypass switch 26 would be closed before isolating the transfer switch. Furthermore, during the time that transfer switch 10 is isolated, bypass switch 26 can be switched into either of its alternative conditions in which switches 28 are closed or switches 29 are closed to connect the load to either the normal source or the emergency source, as may be desired or necessary.

Pairs of contacts 18, 20, and 22 are so formed that they can be mutually engaged and disengaged by bodily movement of transfer switch 10 toward and away from bypass switch 26. In the present example, one contact of each pair, say the contact movable with the transfer switch, comprises two contact elements or plates 44 (FIG. 2). The contact plates 44 are spaced apart but resiliently biased toward each other. The other contact of each pair, say the one which is fixed, is a blade 45 slightly thicker than the minimum spacing between contact plates 44. Furthermore, the free ends of contact plates 44 may be flared to lead blade 45 into the space between them. Thus, when the separated pairs of contacts (FIG. 2) are moved toward each other, the blade 45 of each pair slides between the contact plates 44 of the pair, and the resilient bias on the plates provides a tight frictional engagement between the blade and plates. Upon movement of the pairs of contacts away from each other, blade 45 simply slides out from between plates 44.

Figure 3:
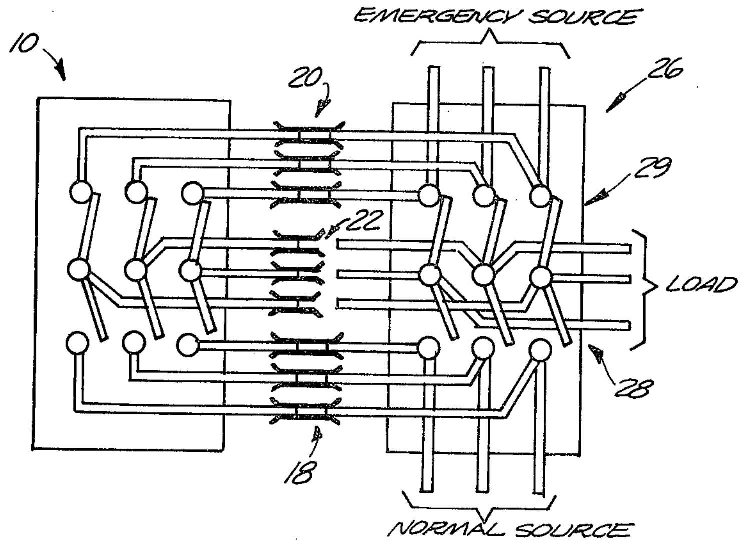
FIG. 3 is a schematic diagram showing the transfer switch in a test position.

The invention provides for a test position of the transfer switch, as shown in FIG. 3. In the test position, transfer switch 10 is spaced from bypass switch 20 an intermediate distance between its normal operative position and its fully isolated position. As a result, pairs of contacts 22 are separated, to isolate the transfer switch from the load, but pairs of contacts 18 and 20 are engaged, electrically connecting the transfer switch to both the normal and emergency power sources. This is accomplished by making at least one of the contacts of each pair 22 shorter than the corresponding contacts of the pairs 18 and 20. In the present example, the contact plates 44 of each pair 22 are shorter than the corresponding contact plates of pairs 18 and 20, and the contact blade 45 of each pair 22 is shorter than the corresponding contact blades of pairs 18 and 20, as may be seen clearly in FIG. 3. In the test position, electric current is available from the particular source which is in operation for testing the controls of the automatic transfer switch 10. However, the load need not be interrupted or disturbed during the test operations. Of course, during testing, either switches 28 or 29 of bypass switch 26 are closed to supply the load with power.

An automatic transfer switch and bypass switch arrangement according to the invention is shown in more detail in FIGS. 4–8. Both the bypass switch 26 and transfer switch 10 in themselves are conventional, and hence will not be described in great detail. Bypass switch 26, as best be seen in FIGS. 4–6, comprises a rectangular nonconductive base plate 27 fixed to a stationary surface 49, such as a building wall, by four brackets 50. Near its lower edge, base 27 carries three terminals 51 for connection by cables to a normal source of power. At its upper edge, base 27 carries three terminals 52 for connection by cables to a load, and just below terminals 52, base 27 carries three terminals 53 for connection by cables to an emergency source of power. For simplicity, the cables have not been shown, but they correspond to the phase conductors 36, 40, and 37 of FIG. 1.

Figure 4:
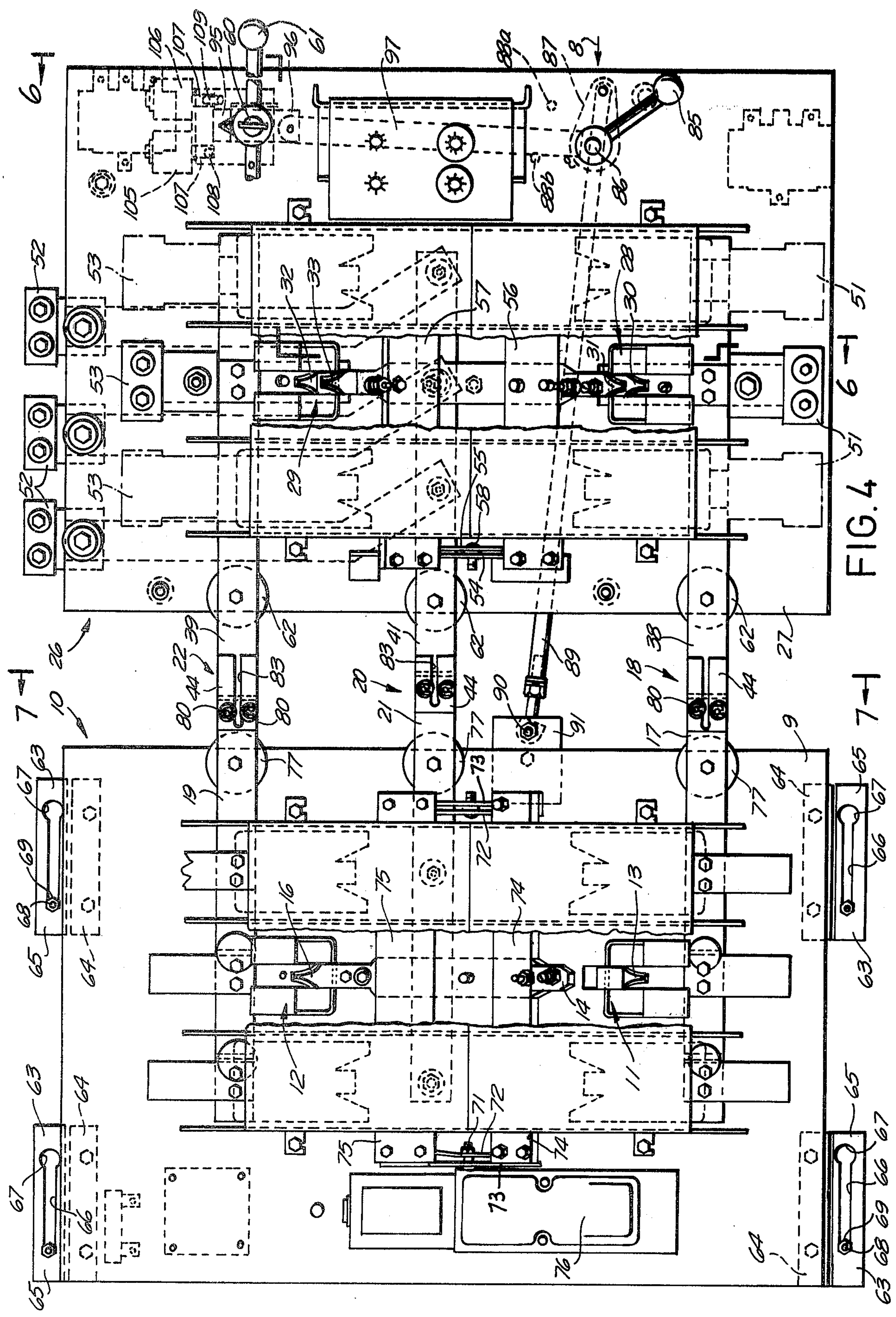
FIG. 4 is a front elevational view of an automatic transfer switch and bypass switch arrangement illustrative of the present invention.
Figure 6:
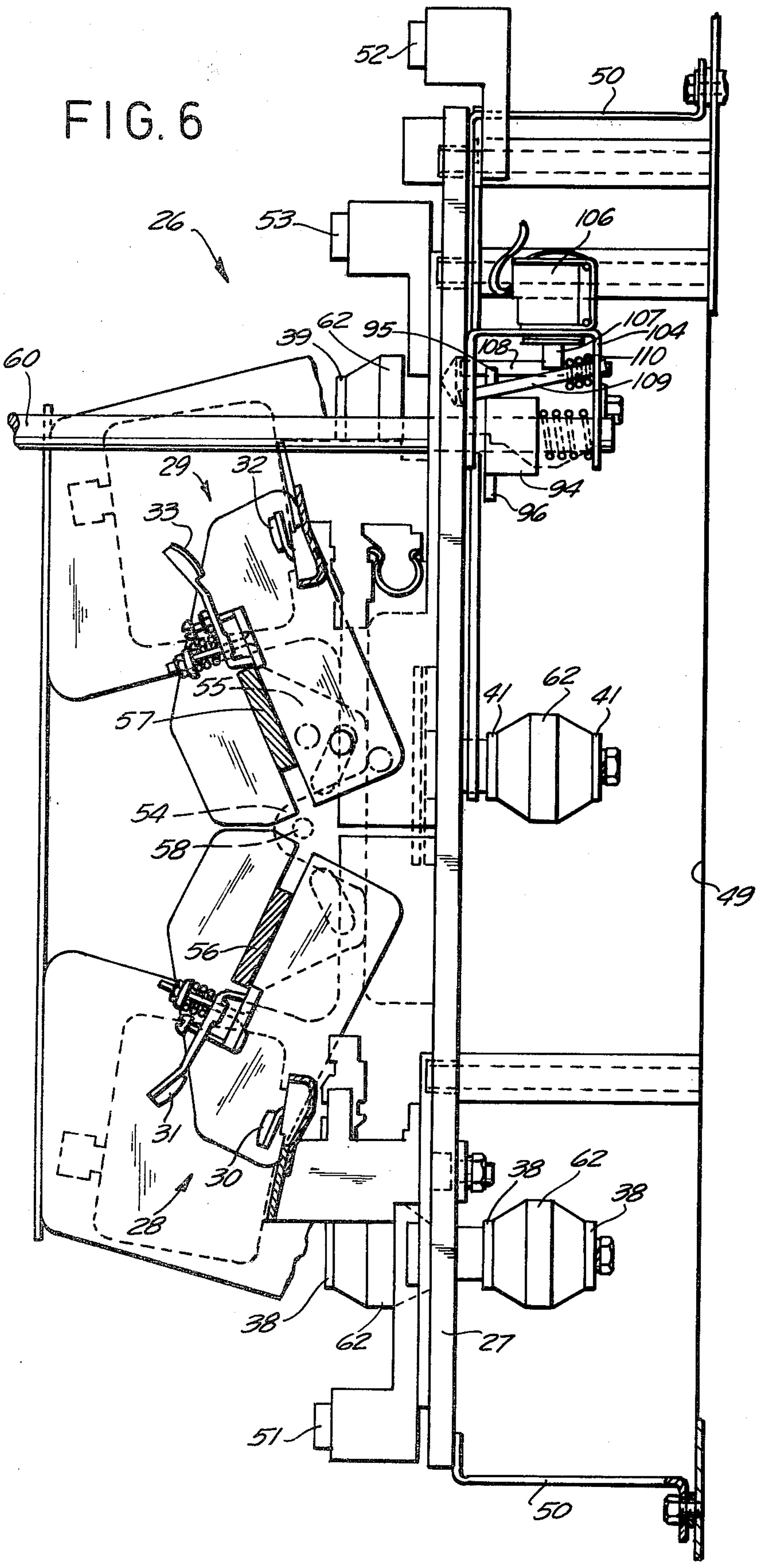
FIG. 6 is a vertical cross-sectional view taken on line 6—6 of FIG. 4.

Each terminal 51 is electrically connected to a stationary switch contact 30 carried by base 27, and each terminal 53 is electrically connected to a stationary switch contact 32 also carried by the base, only one each of the stationary contacts being shown in FIGS. 4 and 6. At about the midpoint between the top and bottom edges of base 27, two upstanding brackets 54 are mounted, only one bracket being shown in FIGS. 4 and 6. A W-shaped arm 55 is pivotally mounted at 58 on each bracket 54, and extending between the two arms 55 are two non-conductive plates 56 and 57. Plate 56 carries three movable contacts 31 and plate 57 carries three movable contacts 33. Movable contacts 31 cooperate with stationary contacts 30 to define switches 28, and movable contacts 33 cooperate with stationary contacts 32 to define switches 29. Each terminal 52 is electrically connected to one movable contact of each of the switches 28 and 29.

The position of arms 55, and hence of movable contacts 31 and 33, is controlled by rotating a shaft 60 about its longitudinal axis by means of a handle 61 (FIG. 4). In FIGS. 4 and 6, bypass switch 26 is shown in its neutral condition in which switches 28 and 29 are both open. By rotating shaft 60 clockwise (as viewed in FIG. 4) through a small angle, arms 55 are pivoted by means of a suitable linkage mechanism (not shown) to close switches 28. If shaft 60 is rotated counterclockwise, on the other hand, switches 29 close.

Figure 5:
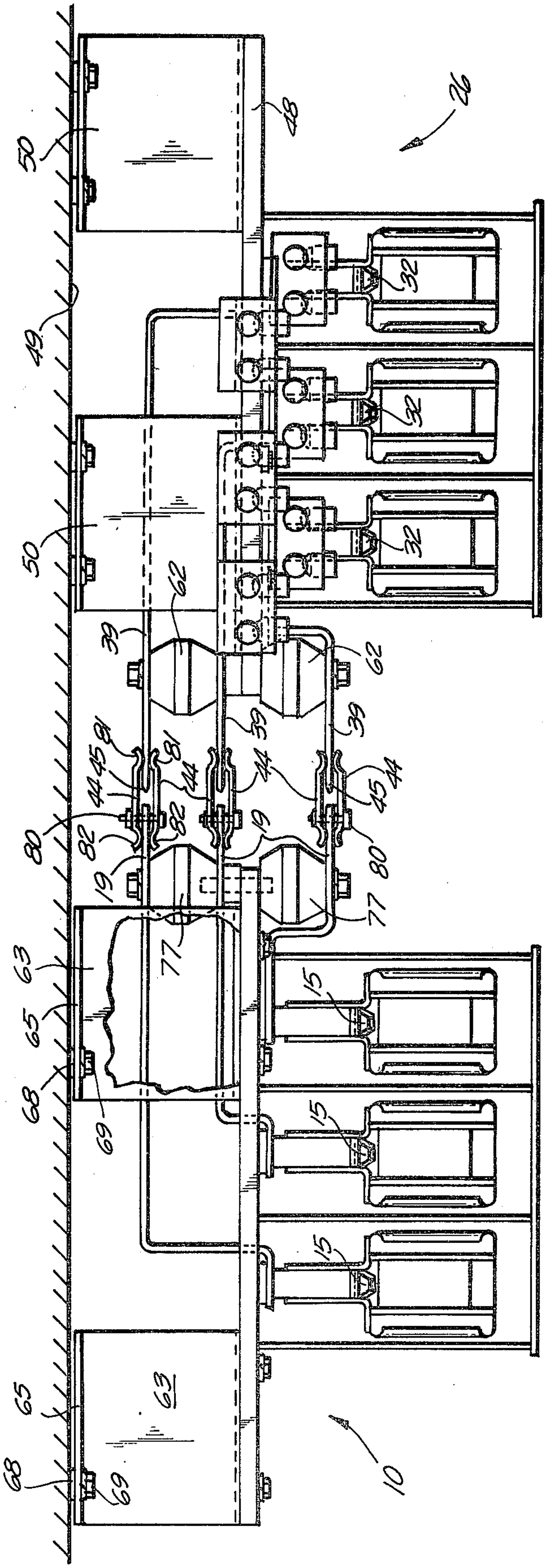
FIG. 5 is a top view of the arrangement of FIG. 4.

Nine rigid conductor bars 38, 39 and 41 carried by base plate 27 project beyond the left side edge of the base plate, as viewed in FIGS. 4 and 5. The conductor bars are located at three different levels (see FIG. 4), three bars being arranged one behind the other at each level (see FIGS. 5 and 6). At each level, the spacing between the bars is maintained by insulators 62. Bars 38 are electrically connected to terminals 51 (normal source), bars 39 are electrically connected to terminals 53 (emergency source), and bars 41 are electrically connected to terminals 52 (load). Each of the bars terminates at its free end in a contact blade 45 (FIG. 5).

Figures 7, 8:
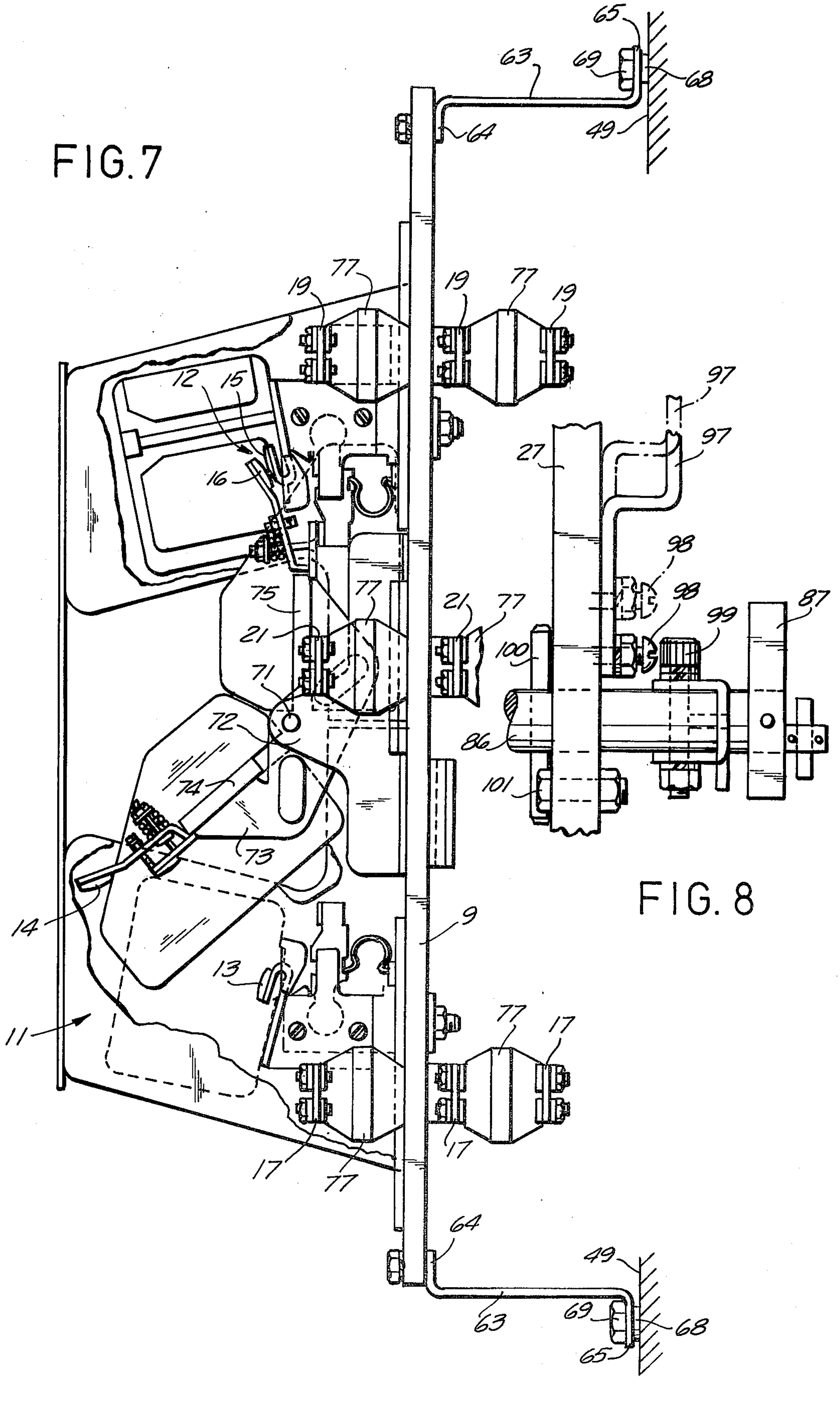
FIG. 7 is a vertical cross-sectional view taken on line 7—7 of FIG. 4.
FIG. 8 is a fragmentary side elevational view looking in the direction of the arrow 8 in FIG. 4.

Automatic transfer switch 10, as best seen in FIGS. 4, 5, and 7, comprises a rectangular base plate 9 carrying four brackets 63 on its rear surface. Each bracket includes a horizontal central portion having an inwardly directed flange 64 at one end and an outwardly directed flange 65 at its other end. Each flange 64 is fixed, as by bolts, to the rear face of base plate 9. Each flange 65 is formed with an elongated horizontal slot 66, each slot having a circular enlargement 67 at its right end as viewed in FIG. 4. A single bolt 68 projecting from stationary surface 49 extends through each slot 66, and a nut 69 having a diameter larger than the width of slot 66 is threaded on to the free end of each bolt 68. Thus, base 9 is supported by the four bolts 68 and is prevented from falling away from surface 49 by nuts 69.

When transfer switch 10 is in its normal operative position, as shown in FIGS. 4 and 5, each bolt 68 is located at the left end of its respective slot 66. Transfer switch base 9 can be moved to the left in FIGS. 4 and 5, since bolts 68 are sized to be slidable within slots 66. If desired, a roller may be fitted around each bolt and within each slot to facilitate movement of the transfer switch 10. If the transfer switch is moved far enough to the left to bring the enlargement 67 of slots 66 into registry with nuts 69, the entire transfer switch can be removed from stationary surface 49, since enlargements 67 are larger than nuts 69.

Base plate 9 of transfer switch 10 carries two upstanding brackets 72 (FIGS. 4 and 7). A W-shaped arm 73 is pivotally mounted at 71 on each bracket 72, and extending between the two arms 73 are two non-conductive plates 74 and 75. Plate 74 carries three movable contacts 14 and plate 75 carries three movable contacts 16. Movable contacts 14 cooperate with stationary contacts 13 to define switches 11, and movable contacts 16 cooperate with stationary contacts 15 to define switches 12.

The position of arms 73, and hence of movable contacts 14 and 16, is controlled by a conventional electromechanical operator indicated at 76 in FIG. 4. In FIGS. 4 and 7, transfer switch 10 is shown in a condition in which switches 12 are closed and switches 11 open. In this condition, the transfer switch is serving to connect the load to the emergency power source. At the appropriate time, such as when the normal power source comes back into operation, operator 76 acts to swing arms 73 counterclockwise in FIG. 7 about pivot 71 so as to close switches 11 and open switches 12.

Nine rigid conductor bars 17, 19, and 21 carried by base plate 9 project beyond the right side edge of the base plate, as viewed in FIGS. 4 and 5. The conductor bars are located at three different levels (see FIG. 4), three bars being arranged one behind the other at each level (see FIGS. 5 and 7). At each level, the spacing between the bars is maintained by insulators 77. The locations of bars 17, 19, and 21 correspond to the locations of bars 38, 39, and 41 of the bypass switch 26, so that each bar 17 is aligned with one of the bars 38, each bar 19 is aligned with one the bars 39, and each bar 21 is aligned with one of the bars 41. Bars 17 are electrically connected to the three stationary switch contacts 13, bars 19 are electrically connected to the three stationary switch contacts 15, and each bar 21 is electrically connected to one movable contact of each of the switches 11 and 12.

Mounted on the free end of each of the bars 17, 19, and 21 are a pair of contact elements or plates 44 (FIGS. 4 and 5). Each pair of contact plates 44 is arranged against the opposite faces of its respective bar and held in place by two pins 80 extending through aligned holes in the bar and plates. Each plate 44 is formed with convex end portions 81 and 82, and is also formed with a longitudinal slot 83 to increase its resilience. One of the contact blades 45 can slide between each pair of contact plates 44, the concave end portions 81 serving to guide blade 45 between plates 44. As blade 45 moves between plates 44; it presses the plates away from each other causing convex end portions 82 to press against the bar carrying them. The resulting flexure or plates 44 away from each other produces a tight resilient frictional contact between blade 45 and both plates 44. If desired, the resilient pressure between the blade 45 and plates 44 could be provided by spring biasing the plates toward each other.

Movement of transfer switch 10 toward and away from bypass switch 26 is controlled by a handle 85 (FIG. 4) fixed to the front end of a rotatable shaft 86 extending in a front-to-back direction through base plate 27 of bypass switch 26 (see also FIG. 8). At its rear end, shaft 86 carries a link 87 rotatable with the shaft. Pivotally joined at 88 to link 87 is one end of a rod 89, the other end of which is pivoted at 90 to a bracket 91 fixed to base plate 9 of the transfer switch. When handle 85 is in the position shown in FIG. 4, transfer switch 10 is in its rightwardmost position, i.e., its normal operative position, wherein all the mutually cooperative pairs of contacts 18, 20, and 22 are engaged. As handle 85 is rotated counterclockwise in FIG. 4, link 87 moves rod 89 toward the left and the rod in turn pushes base 9 of the transfer switch away from the bypass switch. During rotation of handle 85, when pivot 88 reaches the location indicated as 88*a* in FIG. 4, transfer switch 10 will be in the test position, i.e., pairs of contacts 18 and 22 engaged and pairs of contacts 20 disengaged. When pivot 88 reaches location 88*b*, all the pairs of contacts are separated and the transfer switch is isolated.

As a safety precaution, the invention provides means for preventing counterclockwise rotation of handle 85 from its position shown in FIG. 4 when bypass switch handle 61 is in the position, shown in FIG. 4, wherein switches 28 and 29 are all open. If this precaution were not provided, movement of the transfer switch to isolate it while the bypass switch is in its neutral position would inadvertently cut off all power to the load. In addition, the arc which would be drawn across the pairs of contacts 18, 20, and 22 as they separate would damage the contacts.

Referring to FIGS. 4 and 6, a collar 94 is fixed to shaft 60, the collar having an upwardly projecting rectangular ear 95 and a downwardly projecting rectangular ear 96. Pivoted to ear 96 is the upper end of a substantially vertical bar 97 (FIGS. 4 and 8), the lower end of which is formed with two right angle bends and terminates just above shaft 86. An abutment, in the form of a screw 98 is carried by the lower end of bar 97. Shaft 86 carries a projection, in the form of a bolt 99 extending through a hole in the shaft. At the front face of base plate 27, a pin 100 extends through a hole in shaft 86, and an abutment, in the form of a bolt head 101, projects forwardly from base plate 27. When handles 85 and 61 are in the positions shown in FIG. 4, bolt 99 is aligned with screw 98, and the lower portion of pin 100 engages bolt head 101. Thus, shaft 86 cannot be rotated, and hence transfer switch 10 cannot be moved.

When handle 61 is rotated either clockwise or counterclockwise in FIG. 4, to close either switches 28 or 29, ear 96 is elevated and raises bar 97 to the position shown in broken lines in FIG. 8. As a result, screw 98 is moved upwardly out of alignment with bolt 99, and hence shaft 86 can be pulled longitudinally forwardly (to the left in FIG. 8), by means of handle 85. Pin 86 thus moves into a plane in front of bolt head 101 and shaft 86 is free to rotate counterclockwise in FIG. 4 to move transfer switch 10 to the left. While transfer switch 10 is in its isolated position, shaft 86 can be pushed back to its original position (to the right in FIG. 8) so as to move bolt 99 out of the path of downward movement of screw 98. This permits complete freedom of movement of handle 61 so as to permit switching of the load to either source by means of the bypass switch 26.

As an additional safety precaution, the invention provides means for preventing manipulation of the bypass switch 26 to a condition in which it connects the load to a source other than the source to which the load is connected by the transfer switch 10. If this precaution were not provided, there would almost certainly be damage to the load and to the equipment should the load be connected to both sources simultaneously, since among other reasons the sources would almost certainly not be operating in phase with each other.

Referring to FIGS. 4 and 6, mounted on the rear face of base plate 27 is an inverted U-shaped bracket 104 carrying two side-by-side solenoids 105 and 106. Each solenoid has a depending armature 107, and in vertical alignment with the solenoid armatures are two generally horizontal pins 108 and 109 extending in a front-to-rear direction and supported by bracket 104. Pins 108 and 109 are spring biased by a spring 110 surrounding each pin (only one being shown in FIG. 6) so that they always tend to assume a horizontal condition; the pins are arranged one to each side of ear 95 projecting upwardly from collar 94 fixed to shaft 60. When a solenoid 105, 106 is energized, its armature 107 is pulled upwardly permitting its respective pin 108, 109 to assume a horizontal condition. When horizontal, the pin 108, 109 is out of the path of rotation of ear 95 and hence does not interfere with rotation of shaft 60. When a solenoid 105, 106 is deenergized, its armature drops and pushes its respective pin 108, 109 downwardly into the path of rotation of ear 95, and hence prevents rotation of shaft 60 in a direction which moves ear 95 toward the depressed pin.

Energization of solenoids 105 and 106 is controlled by the source feeding the load, i.e., by the condition of transfer switch 10. Specifically, in FIG. 4, switches 12 of the automatic transfer switch are closed so that the load is being supplied by the emergency source. Thus, solenoid 105 is energized and solenoid 106 deenergized. Therefore, pin 108 is up (horizontal) and pin 109 is depressed (see FIG. 8) by armature 107 of solenoid 106. As a result, due to the interfering relationship between pin 109 and ear 95 handle 61 cannot be rotated clockwise in FIG. 4 to close switches 28, which would connect the load to the normal source. Conversely, if switches 11 of the transfer switch were closed so that the load were being supplied by the normal source, solenoid 106 would be energized and solenoid 105 deenergized. As a result, pin 108 would be depressed, thereby preventing rotation of handle 61 in a counterclockwise direction to close switches 29, which would connect the load to the emergency source.

Although in the example of the invention described above, the transfer switch 10 and bypass switch 26 are arranged side-by-side, other arrangements are possible. The two switches can be arranged one behind the other, either back-to-back or with the front of the transfer switch facing the back of the bypass switch. Also, the two switches can be arranged one above the other. In any of these cases, the rigid conductors projecting from the switches will be arranged so that the mutually cooperable pairs of contacts 18, 20, and 22 are between the transfer switch and bypass switch. Furthermore, the two switches need not necessarily be mounted on the same stationary support surface. For example, where the switches are extremely large, the transfer switch may be supported on wheels so that it is rolled, manually or otherwise, toward and away from the bypass switch to plug it in or unplug it. In addition, the transfer switch need not necessarily be moved in a straight line when isolating it. The bases of the transfer and bypass switches could be hinged to each other so that the transfer switch moves along an arcuate path with respect to the bypass switch.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. An automatic transfer and bypass switch arrangement comprising:

(a) an automatic transfer switch, (b) a bypass switch having an open condition and at least one closed condition, (c) mutually cooperable contacts for electrically connecting the two switches when the cooperable contacts are engaged with one another, (d) means for moving the entire automatic transfer switch in two opposite directions to disengage and engage, respectively, the cooperable contacts, whereby the automatic transfer switch may be electrically disconnected from the bypass switch solely by the act of moving the transfer switch away from the bypass switch, and (e) means for rendering said moving means ineffective to move the automatic transfer switch in a direction to disengage the cooperable contacts any time the bypass switch is in its open condition.

2. An automatic transfer and bypass switch as defined in claim 1 wherein the mutually cooperable contacts are carried by the transfer and bypass switches, and the transfer switch is movable toward and away from the bypass switch.

3. An automatic transfer and bypass switch as defined in claim 1 wherein the means for moving the automatic transfer switch includes a movable actuator, and wherein the means for preventing movement of the transfer switch includes means for interfering with movement of the actuator in a way which causes movement of the transfer switch when the bypass switch is open, the interfering means being ineffective to inferfere with movement of the actuator when the bypass switch is closed.

4. An automatic transfer and bypass switch as defined in claim 3 including a handle for operating the bypass switch, and wherein the movable actuator includes a handle, and the interfering means includes a link movable by the bypass switch handle and extending to the actuator handle.

5. An automatic transfer and bypass switch as defined in claim 1 wherein the transfer switch includes a base, and including mounting means carried by the base for slidably mounting the base for movement toward and away from the bypass switch.

6. An automatic transfer and bypass switch as defined in claim 5 wherein the mounting means includes a slotted bracket and a mounting pin slidably accommodated within the bracket slot.

7. An automatic transfer and bypass switch as defined in claim 1 including a stationary base, and wherein the means for moving the automatic transfer switch includes link means pivotally connected between the transfer switch and the stationary base, and actuator means for moving the link means between two extreme positions corresponding to engagement and disengagement of the cooperable contacts, respectively.

8. An automatic transfer and bypass switch as defined in claim 1 wherein the mutually cooperable contacts engage one another solely by friction.

9. An automatic transfer and bypass switch as defined in claim 1 wherein the mutually cooperable contacts include a plurality of pairs of cooperable contacts, one of each pair of contacts being carried by the transfer switch and the other of each pair being carried by the bypass switch.

10. An automatic transfer and bypass switch as defined in claim 1 wherein the mutually cooperable contacts include a plurality of pairs of cooperable contacts, one contact of each pair including two contact elements spring biased toward each other, and the other contact of each pair including a blade element adapted to slide between the two contact elements of the one contact.

11. An automatic transfer and bypass switch arrangement comprising:

(a) an automatic transfer switch which can be switched between one condition for connecting a normal source of power to a load and an alternative condition for connecting an emergency source of power to the load, (b) a bypass switch having three alternative conditions, the bypass switch in one condition connecting the normal source of power to the load, in a second condition connecting the emergency source of power to the load, and in a third condition connecting neither source of power to the load, and (e) means for preventing switching of the bypass switch to a condition in which it connects the load to a source other than the source being connected to the load by the transfer switch.

12. An automatic transfer and bypass switch as defined in claim 11 including a movable actuator for switching the bypass switch from one to another of its conditions, and wherein the preventing means includes abutment means responsive to the condition of the transfer switch for interfering with the movement of the actuator.

13. An automatic transfer and bypass switch as defined in claim 12 wherein the abutment means is movable into and out of the path of movement of the actuator, and including electrical operator means for controlling the movement of the abutment means.

14. An automatic transfer and bypass switch arrangement comprising:

(a) an automatic transfer switch, (b) a bypass switch, (c) mutually cooperable contacts for electrically connecting the two switches when the cooperable contacts are engaged with one another, (d) means for moving the entire automatic transfer switch in two opposite directions to disengage and engage, respectively, the cooperable contacts, whereby the automatic transfer switch may be electrically disconnected from the bypass switch solely by the act of moving the transfer switch away from the bypass switch, and (e) at least three pairs of mutually cooperable contacts for connecting the transfer switch to a normal source of power, to an emergency source of power, and to a load, respectively, the pairs of contacts being arranged so that when the transfer switch is moved from a position in which the cooperable contacts are disengaged toward a position of engagement the two pairs of contacts for connecting the transfer switch to the sources of power engage before the pair of contacts for connecting the transfer switch to the load.

15. An automatic transfer and bypass switch as defined in claim 14 wherein at least one contact of each pair for connecting the transfer switch to the sources of power is longer than the corresponding contact of the pair of connecting the transfer switch to the load.

* * * * *